United States Patent
Lee et al.

(10) Patent No.: US 7,210,052 B2
(45) Date of Patent: Apr. 24, 2007

(54) METHOD AND SYSTEM FOR SYNCHRONIZING ALL CLOCK SOURCES OF SEMICONDUCTOR DEVICES

(75) Inventors: De-Wei Lee, Kaohsiung (TW); Wu-Han Yang, Kaohsiung (TW)

(73) Assignee: BenQ Corporation, Taoyuan (TW)

( * ) Notice: Subject to any disclaimer, the term of this patent is extended or adjusted under 35 U.S.C. 154(b) by 486 days.

(21) Appl. No.: 10/756,879

(22) Filed: Jan. 13, 2004

(65) Prior Publication Data

US 2004/0146071 A1 Jul. 29, 2004

(30) Foreign Application Priority Data

Jan. 15, 2003 (TW) .............. 92100760 A

(51) Int. Cl.
*G06F 1/00* (2006.01)
*G06F 1/12* (2006.01)
*H04L 7/00* (2006.01)
(52) U.S. Cl. .............. 713/500; 713/400; 375/356
(58) Field of Classification Search ........ 713/500, 713/400; 710/58; 375/356
See application file for complete search history.

(56) References Cited

U.S. PATENT DOCUMENTS 393,660 A * 11/1888 Pommerening .............. 213/96

| | | | |
|---|---|---|---|
| 5,999,025 A | 12/1999 | New | 327/156 |
| 6,304,582 B1 | 10/2001 | Zhang et al. | 370/503 |
| 6,754,745 B1 * | 6/2004 | Horvath et al. | 710/58 |

FOREIGN PATENT DOCUMENTS

JP    11202970 A  *  7/1999

* cited by examiner

*Primary Examiner*—Chun Cao
*Assistant Examiner*—Suresh K Suryawanshi
(74) *Attorney, Agent, or Firm*—Ladas & Parry LLP

(57) ABSTRACT

A method and system for clock synchronization of semiconductor devices. The method uses a master-slave configuration to designate a semiconductor device with the lowest rate clock source as a master device and zero all clock sources inside the semiconductor device in order to output the zeroing lowest rate clock source to slave devices for clock synchronization of all clock sources respectively in the slave devices, and further implements a phase checker in each semiconductor device to ensure clock synchronization inside and between the semiconductor devices, so required clock signals are precisely provided to next internal circuits of the semiconductor devices.

9 Claims, 10 Drawing Sheets

METHOD AND SYSTEM FOR SYNCHRONIZING ALL CLOCK SOURCES OF SEMICONDUCTOR DEVICES

BACKGROUND OF THE INVENTION

1. Field of the Invention

The invention relates to a clock synchronization mechanism, more particularly to a method and system for clock synchronization of semiconductor devices, which uses a master-slave configuration in conjunction with a phase checker, such that semiconductor devices synchronize the clocks and thus precisely output clock demands to ensure reliability during operation.

2. Description of the Related Art

At present, for clock synchronization, most designs focus on a single chip, as described in U.S. Pat. No. 5,999,025 and U.S. Pat. No. 6,304,582. The former (U.S. Pat. No. 5,999,025) essentially describes a synchronization of an external clock and an on-chip voltage controlled oscillator (VCO) clock. The latter (U.S. Pat. No. 6,304,582) essentially describes a synchronization of an oscillator clock and clocks in a chip. As cited, these clock synchronization means for multiple chips lack effectiveness with semiconductor devices in which delay locked loop (DLL) or digital clock manager (DCM) is used as a clock source.

SUMMARY OF THE INVENTION

An object of the present invention is to provide a method and system for clock synchronization of semiconductor devices, which uses a master-slave configuration to align all clock sources from delay locked loops (DLLs) or digital clock managers (DCMs), such that semiconductor devices synchronize the clocks and thus precisely output clock demands to ensure reliability during operation.

The present invention is generally directed to a method and system for clock synchronization of semiconductor devices, which uses a master-slave configuration to designate one semiconductor device with the lowest rate clock as a master element and other semiconductor devices as slave elements, use a phase checker in the master element to calibrate all clocks of the master element, use an external phase checker to respectively synchronize clocks in corresponding slave elements with the lowest rate clock and use an internal phase checker to respectively synchronize all clocks in the slave elements, thereby accurately outputting clocks required by circuits inside the semiconductor devices.

DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

Figure 1:
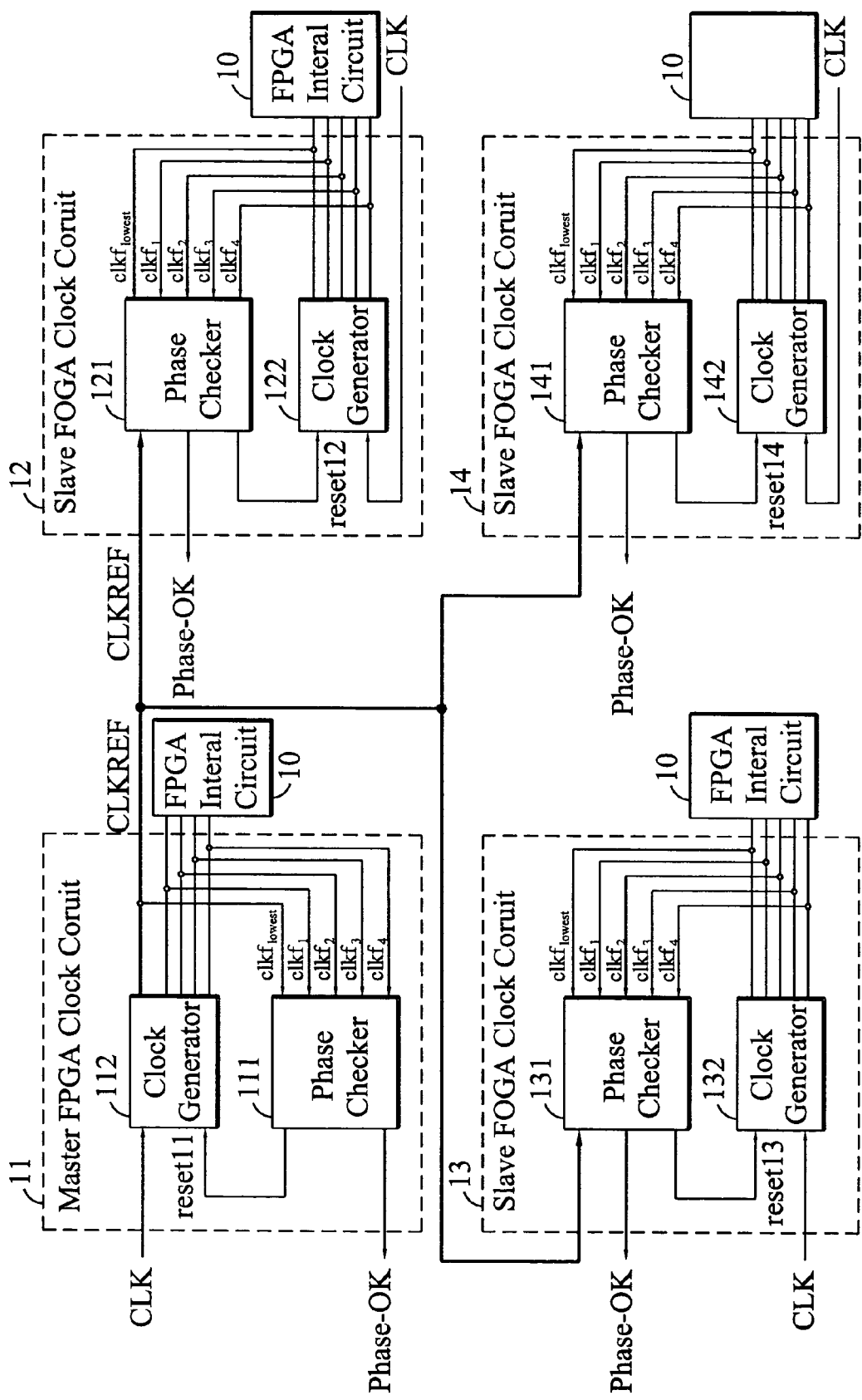
FIG. 1 is a block diagram of a clock synchronization of semiconductor devices with a master-slave configuration according to the invention.

FIG. 1 is a block diagram of a clock synchronization of semiconductor devices with a master-slave configuration according to the invention. In this case, four Field Programmable Gate Arrays (FPGAs) are embodied, without limiting the embodiment, for better explanation. For example, ten Application Specific Integrated Circuits (ASICs) can be used.

As shown in FIG. 1, each Field Programmable Gate Array (FPGA) includes two major functional blocks, respectively to phase checkers 111, 121, 131, 141 and clock generators 112, 122, 132, 142. Each clock generator 112, 122, 132, or 142 internally include delay locked loops (DLLs) or digital clock managers (DCMs) as required clocks. Each phase checker checks rising or falling edges of the clocks for alignment. If any clock is not aligned, a reset is issued. In this case, reset signals reset11-reset14 are output to reset corresponding clock generators for clock re-generation. For clock synchronization, a master-slave configuration is implemented by designating a semiconductor device with the lowest rate clock as a master element, in this case, 11, and other semiconductor devices as slave elements, in this case, 12–14. After other clocks in the master element are calibrated by the lowest rate clock (zeroing), all clocks in the slave elements are synchronized respectively by a reference clock CLKREF from the master element. The cited clock calibration and synchronization are further described in connection with delay locked loops (DLLs).

Figure 2:
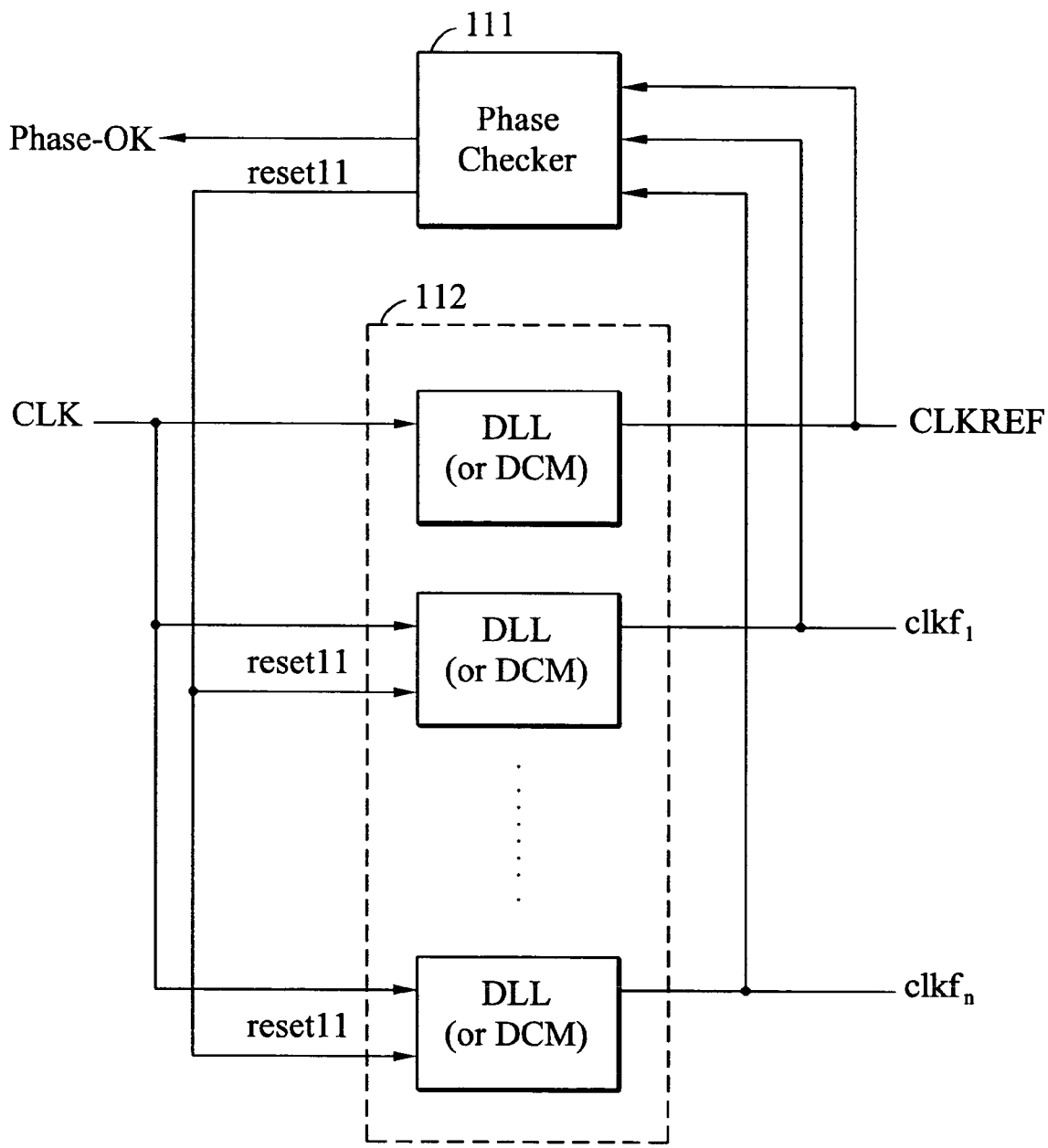
FIG. 2 is a block diagram of the interior of a master element of FIG. 1 according to the invention.

FIG. 2 is a block diagram of the master element 11 of FIG. 1. In FIG. 2, the element 11 has a clock generator consisting of multiple DLLs. As shown in FIG. 2, in the master element 11, at first, zeroing is performed by a phase checker to check if all rising or falling edges of clock sources CLKREF and clkf$_1$–clkf$_n$ are aligned. If any edge is not aligned, the phase checker 111 sends a reset signal reset11 such that the clock generator 112 re-generates clock sources until clock sources are aligned on every rising or falling edge. At this point, zeroing is complete and an aligned clock Phase-OK is sent by the phase checker 111. Additionally, the lowest clock source aligned is referred to as a reference clock source CLKREF and sent to the phase checker 121, 131 and 141 for calibrating slave devices. The clock sources are thus synchronized when the slave devices are calibrated by means of the source CLKREF. Other clock sources are applied in use of internal circuit 10 connecting with a respective slave FPGA.

Figure 3:
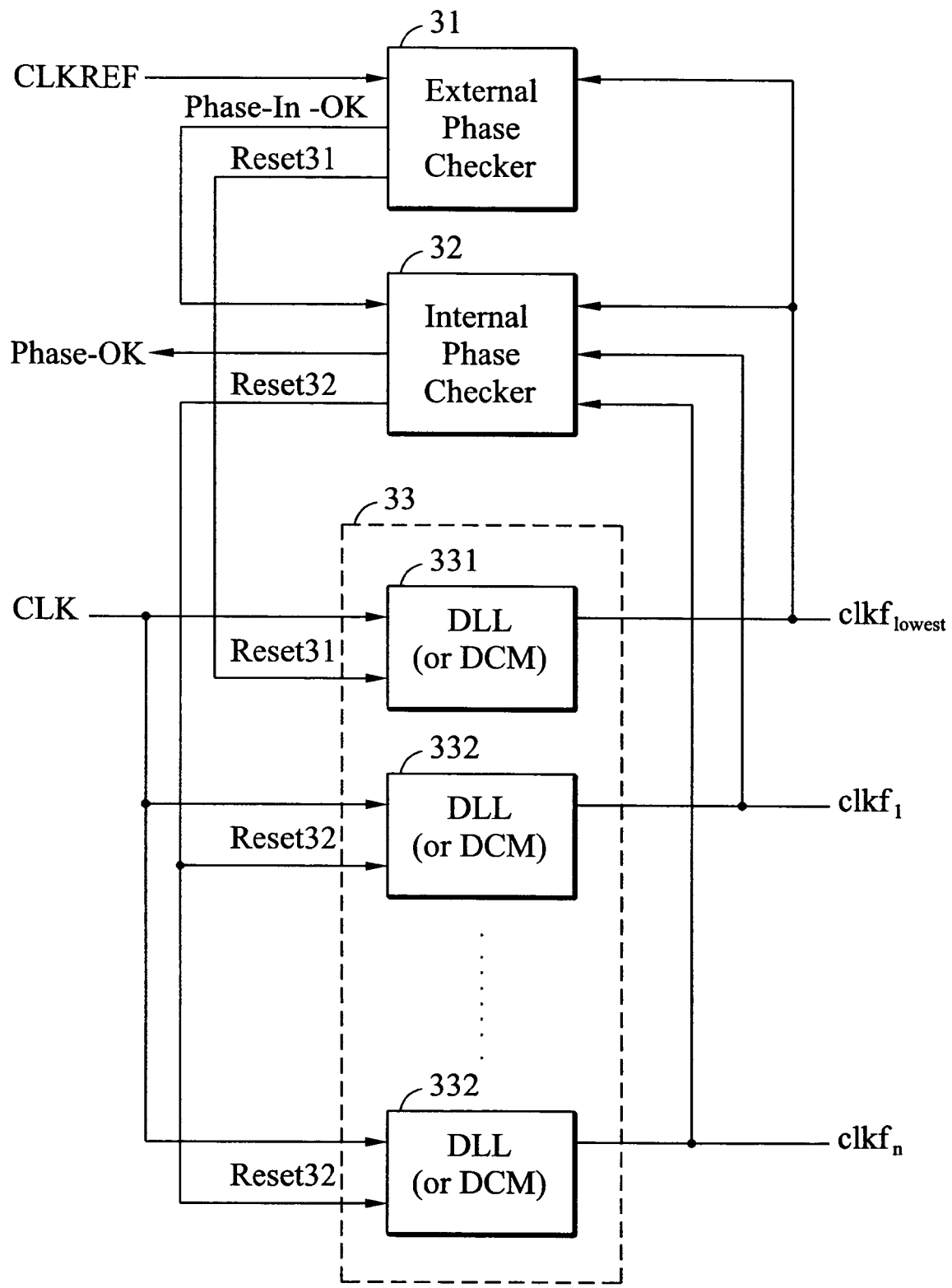
FIG. 3 is a block diagram of the interior of a slave element of FIG. 1 according to the invention.

FIG. 3 is a block diagram of an internal circuit of any slave device according to FIG. 1 of the invention. In FIG. 3, any slave device 12, 13 or 14 includes a clock generator 33 formed by a plurality of DLLs all devices, and a phase checker 121, 131 or 141 formed by an external checker 31 and internal phase checkers 32. As shown in FIG. 3, any slave device 12, 13 or 14 has two checkers 31, 32. The external phase checker 31 first synchronizes a local lowest clock source clkf$_{lowest}$ and the lowest clock source CLKREF and then sends a calibrated signal Phase-In-OK to the internal phase checker 32. The internal phase checker 32 aligns other clock sources clkf$_1$–clkf$_n$ based on the calibrated signal Phase-In-OK and results in clock synchronization. Therefore, all clock sources generated by the DLLs are accurately provided to next FPGA internal circuits. However, if the local lowest clock source clkf$_{lowest}$ does not synchronize with the lowest clock source CLKREF, the external phase checker 31 sends a reset signal Reset31 to a clock generator 331 with the local lowest clock source clkf$_{lowest}$ to re-generate required clock signals. If the signal Phase-In-OK does not synchronize with the local clock sources clkf$_1$–clkf$_n$, the internal phase checker 32 sends a reset signal Reset32 to clock generators 332 with the local clock sources to re-generate required clock signals.

Figure 4:
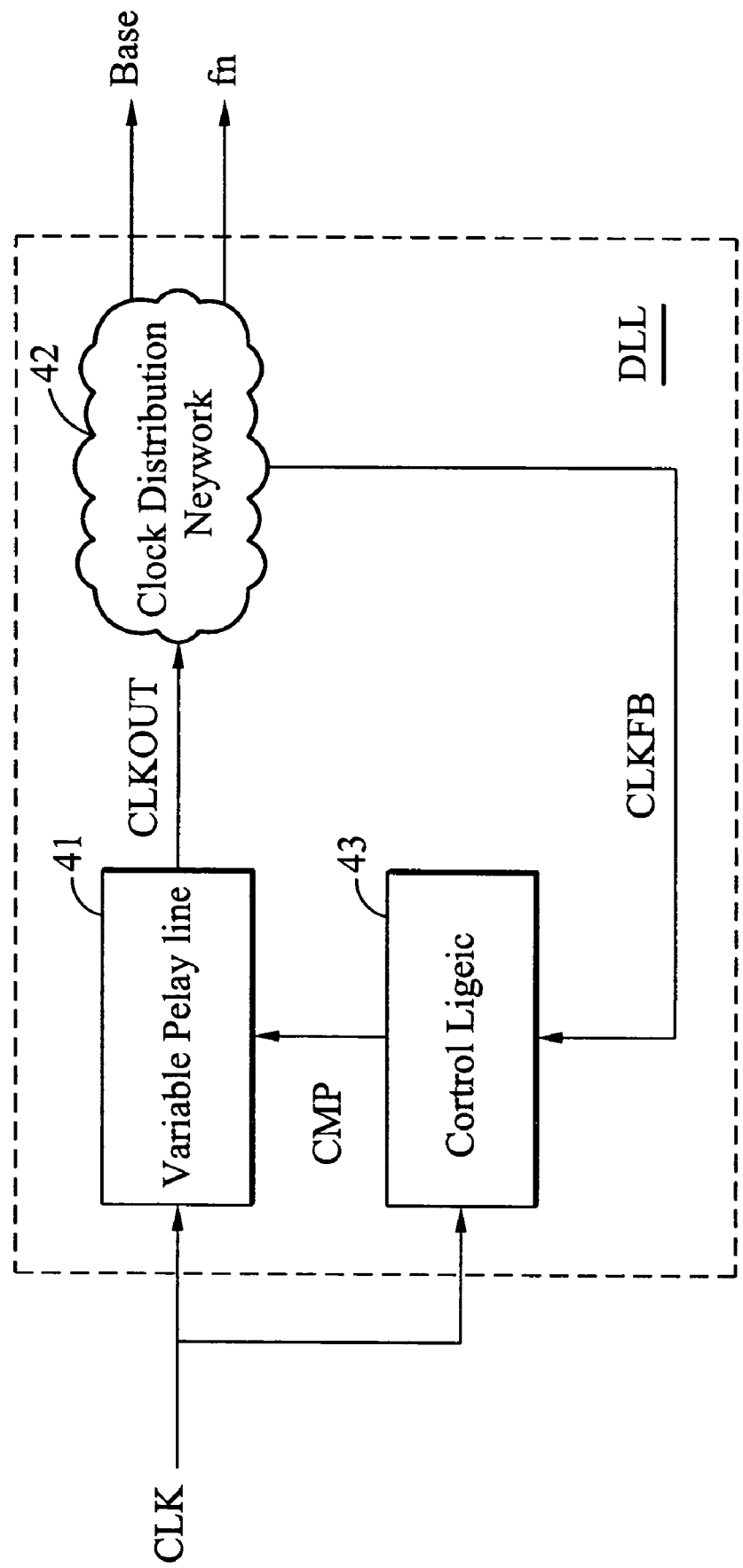
FIG. 4 is a block diagram of the interior of a delay locked loop (DLL) clock generator according to FIG. 2 or 3 of the invention.

FIG. 4 is a block diagram of a DLL interior in FIGS. 2 and 3. As shown in FIG. 4, the DLL essentially includes a variable delay line 41, a clock distribution network 42 and a control logic 43. The variable delay line 41 delays an external input clock CLK for a certain time and then outputs a resulting clock CLKOUT. The network 42 converts the clock CLKOUT into required rate clock sources Base-fn for corresponding circuits and a feedback signal CLKFB is sent to the control logic 43. The control logic 43 compares rising edges of the signals CLK and CLKFB to determine if all edges of the signals CLK and CLKFB are aligned. The comparison result CMP is sent to the delay line 41 for adjustment until the alignment is complete and the DLL is locked. As such, the clock delay effect between the input clock CLK and the load is eliminated, so clock synchronization is obtained. The variable delay line can be a voltage controlled delay.

Figure 5:
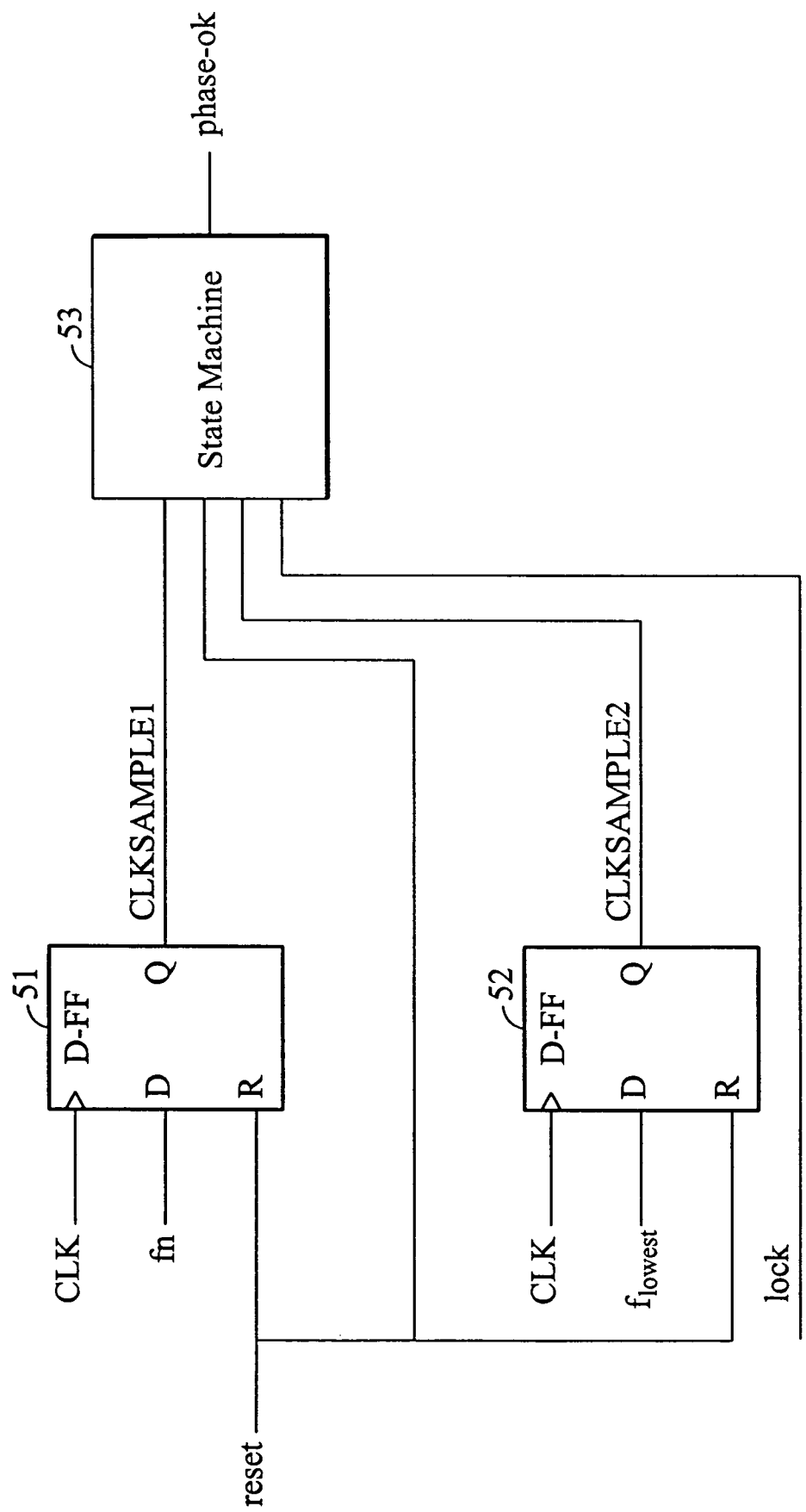
FIG. 5 is an example of a phase checker according to the invention.

FIG. 5 is an example of a phase checker according to the invention. In FIG. 5, for simple description, the phase checker only has two D-type flip-flops (D-FFs) 51, 52 and a finite state machine (FSM) 53. In practice, the D-FF number used depends on required clock frequencies, generally with one-to-one relation. As shown in FIG. 5, when clock line is logic 0, a clock signal fn and a lowest clock signal f$_{lowest}$ are respectively transmitted to the devices 51, 52 to output sampling signals CLKSAMPLE1, CLKSAMPLE2 to the device 53 for phase check. In the phase checker of the master device, the lowest clock signal f$_{lowest}$ represents the signal CLKREF and the signal phase-ok represents the zeroing signal Phase-OK. In the external phase checker of a slave device, the lowest clock signal f$_{lowest}$ represents the signal CLKREF and the signal phase-ok represents the calibrating signal Phase-In-OK. In the internal phase checker of the slave device, the lowest clock signal f$_{lowest}$ represents the local lowest clock signal clkf$_{lowest}$ of the slave device and the signal phase-ok represents the zeroing signal Phase-OK. In the following, further description of timings of external and internal phase checkers is given.

Figure 6:
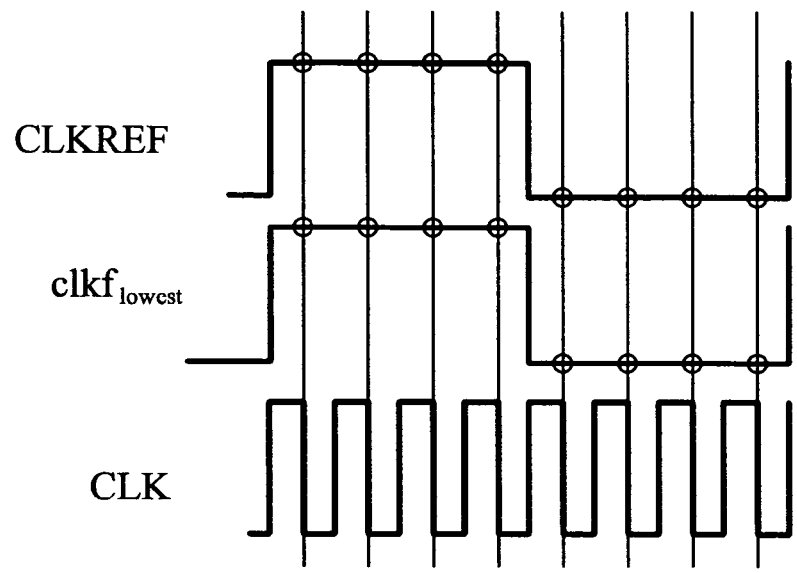
FIG. 6 is a timing of an external phase checker according to the invention.
Figure 7:
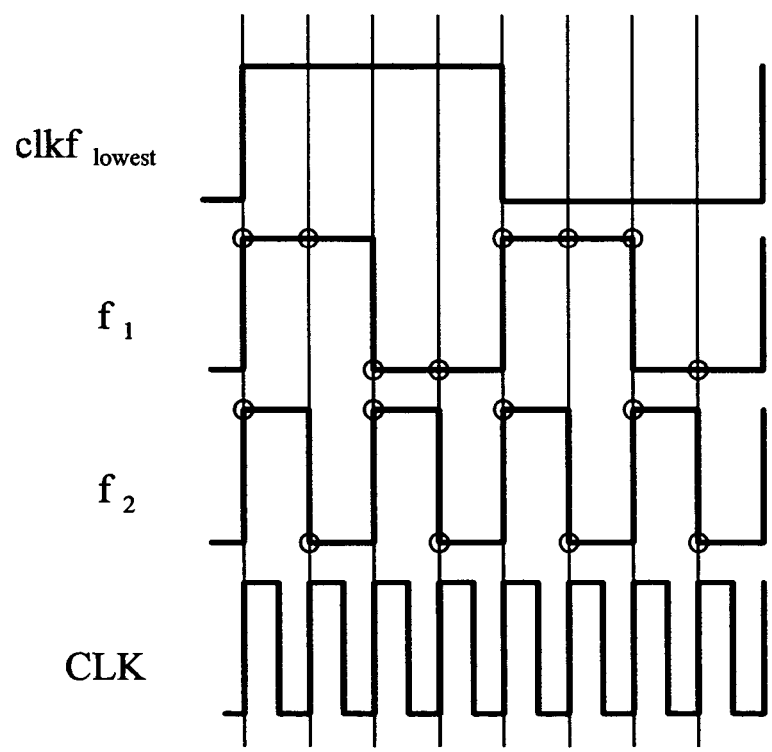
FIG. 7 is a timing of an internal phase checker according to the invention.

FIG. 6 is a timing diagram of the external phase checker of a slave device. FIG. 7 is a timing diagram of the internal phase checker of the slave device. As shown in FIG. 6, in each falling edge of input clock signal CLK, the external phase checker synchronously checks each pair of falling edges of the lowest clock signals (circle mark) CLKREF, clkf$_{lowest}$ of the master device and the slave device to determine if the two have the same value. If not, a reset signal Reset is sent to re-input the two lowest clock signals for re-alignment. Two lowest clock signals having the same value indicates that the master device 11 is calibrated or the slave devices connected to the master device 11 are aligned. At this point, as shown in FIG. 7, the external checker refers to the local lowest clock signal (aligned clkf$_{lowest}$) as an aligned signal Phase-In-OK, inputting to the internal phase checker to perform aligning steps described in FIG. 6. Thus, all local clock sources required by the internal circuits of the Field Programmable Gate Array (FPGA) are aligned, in this case, f$_1$–f$_3$, to obtain clock synchronization of all semiconductor devices.

Figure 8:
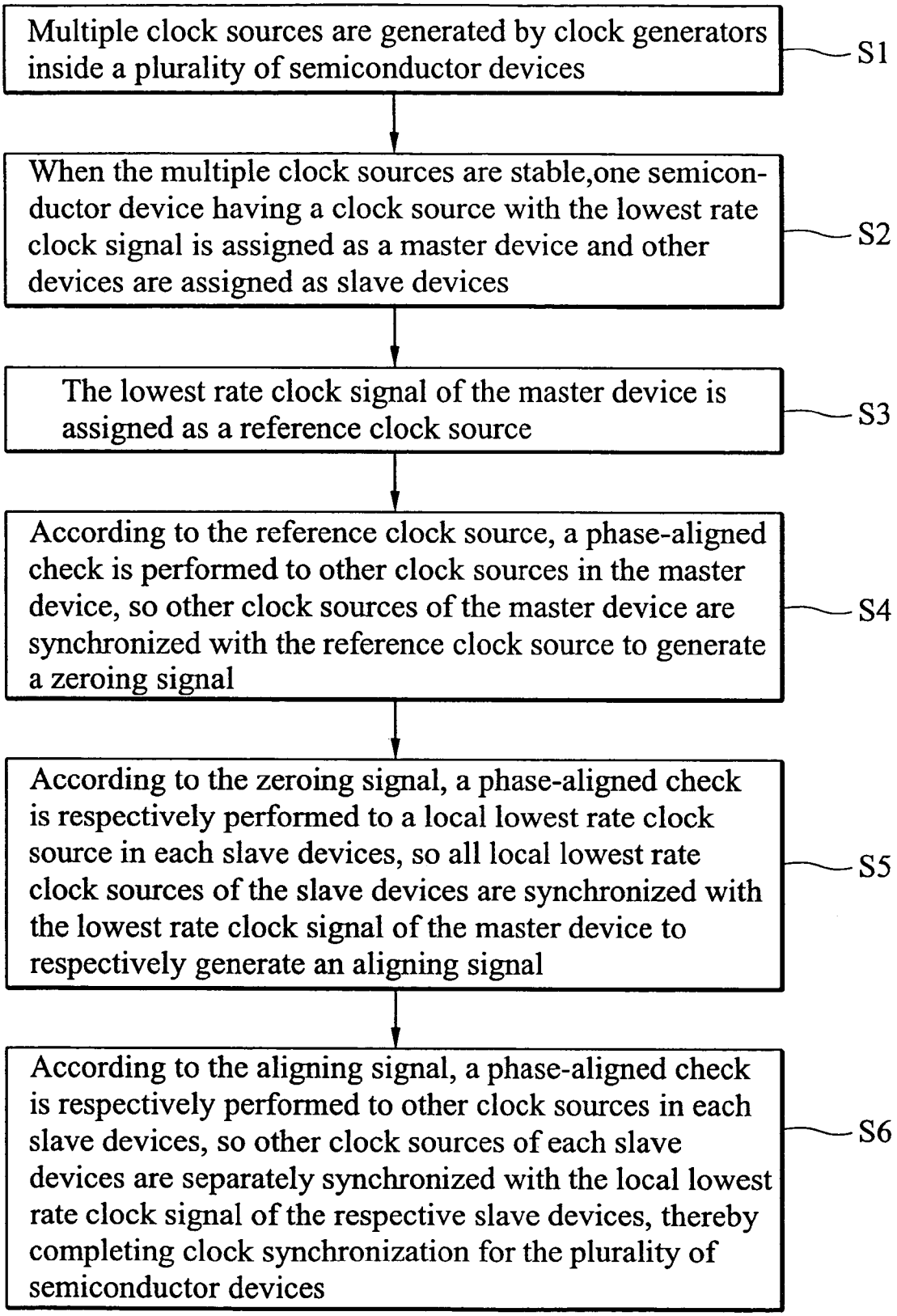
FIG. 8 is a flowchart of an operating method according to the invention.

FIG. 8 is an operating flowchart of the invention. As shown in FIG. 8, multiple clock sources are generated by clock generators inside a plurality of semiconductor devices (S1). When the multiple clock sources are stable, one semiconductor device having a clock source with the lowest rate clock signal is designated as a master device and other devices are designated as slave devices (S2). The lowest rate clock signal of the master device is designated as a reference clock source (S3). According to the reference clock source, a phase-aligned check is performed on other clock sources in the master device, such that other clock sources of the master device are synchronized with the reference clock source to generate a zeroing signal (S4). According to the zeroing signal, a phase-aligned check is respectively performed on a local lowest rate clock source in each slave device, such that all local lowest rate clock sources of the slave devices are synchronized with the lowest rate clock signal of the master device to respectively generate an aligning signal (S5). According to the aligning signal, a phase-aligned check is respectively performed on other clock sources in each slave device, such that other clock sources of each slave device are separately synchronized with the local lowest rate clock signal of the respective slave devices (S6). Therefore, clock synchronization for the plurality of semiconductor devices is complete.

Figure 9:
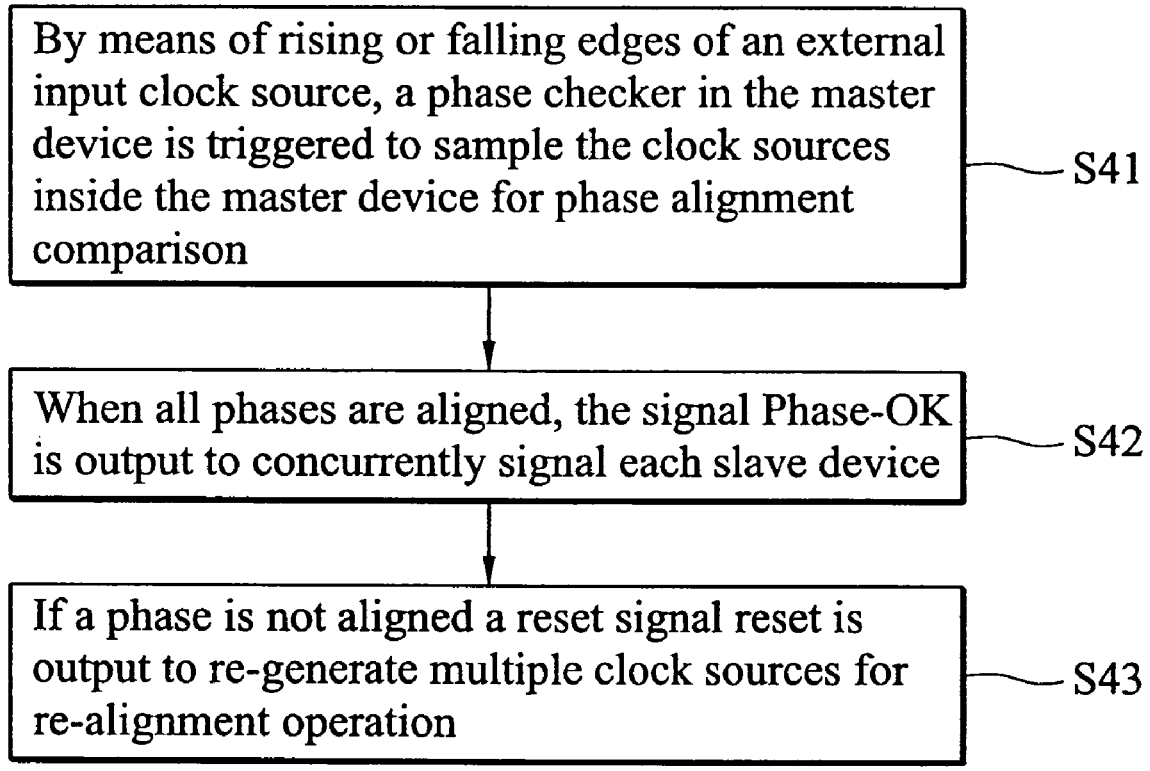
FIG. 9 is a flowchart of a synchronization of clock sources inside the master element according to FIG. 8 of the invention.

Step S4 is further divided into the steps of FIG. 9, including that by means of rising or falling edges of an external input clock source, a phase checker in the master device is triggered to sample the clock sources inside the master device for phase alignment comparison (S41); when all phases are aligned, the signal Phase-OK is output to concurrently signal each slave device (S42); and otherwise, a reset signal reset is output to re-generate multiple clock sources for re-alignment operation (S43).

Figure 10:
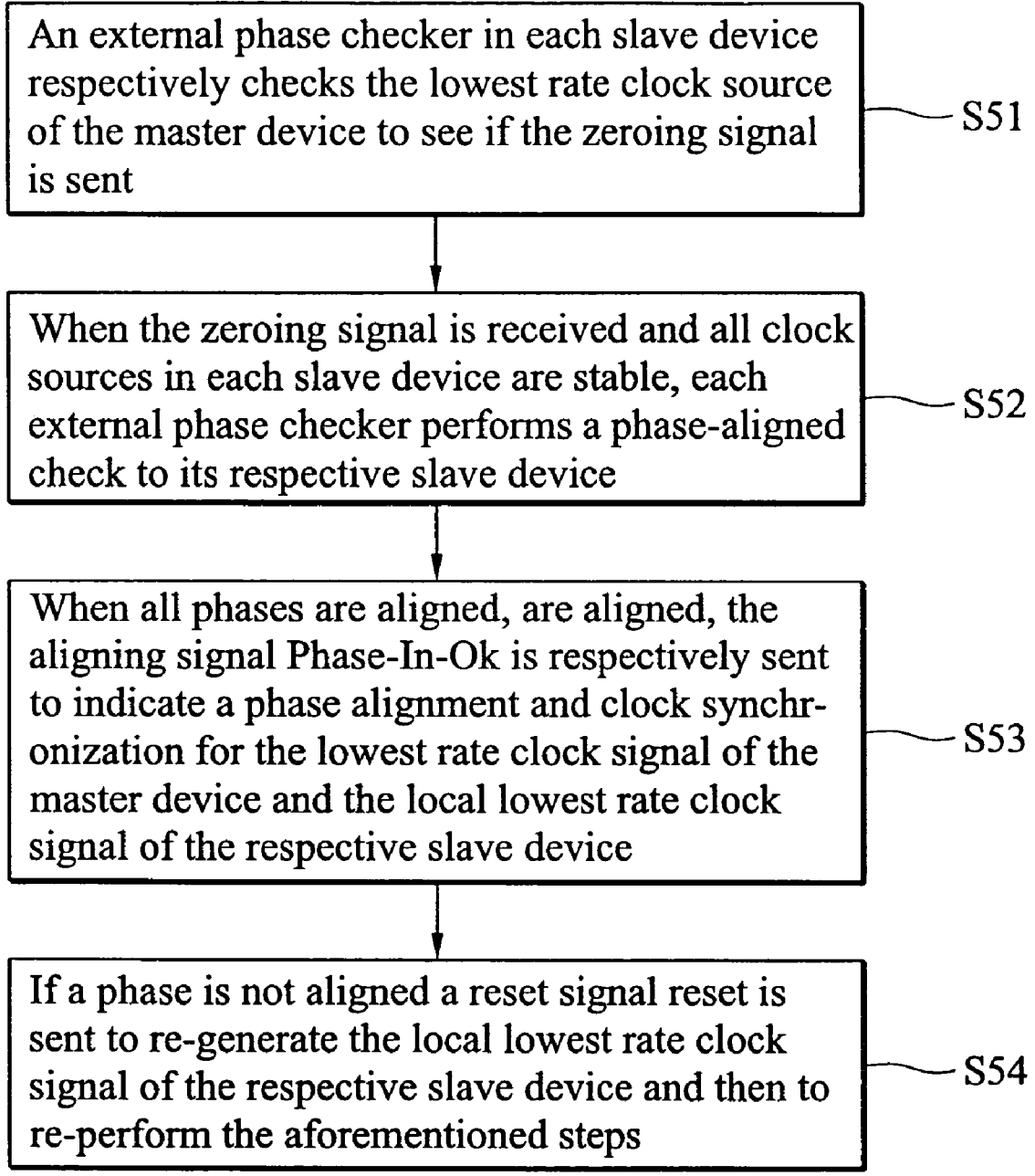
FIG. 10 is a flowchart of a clock synchronization between the master and slave elements according to FIG. 8 of the invention.

Step S5 is further divided into the steps of FIG. 10, including that an external phase checker in each slave device respectively checks the lowest rate clock source of the master device to determine if the zeroing signal has been sent (S51); when the zeroing-signal is received and all clock sources in each slave device are stable, each external phase checker performs a phase-aligned check on its respective slave device (S52); when all phases are aligned, the aligning signal Phase-In-OK is respectively sent to indicate a phase alignment and clock synchronization for the lowest rate clock signal of the master device and the local lowest rate clock signal of the respective slave device (S53); and otherwise, a reset signal reset is sent to re-generate the local lowest rate clock signal of the respective slave device and then repeat the aforementioned steps (S54).

Figure 11:
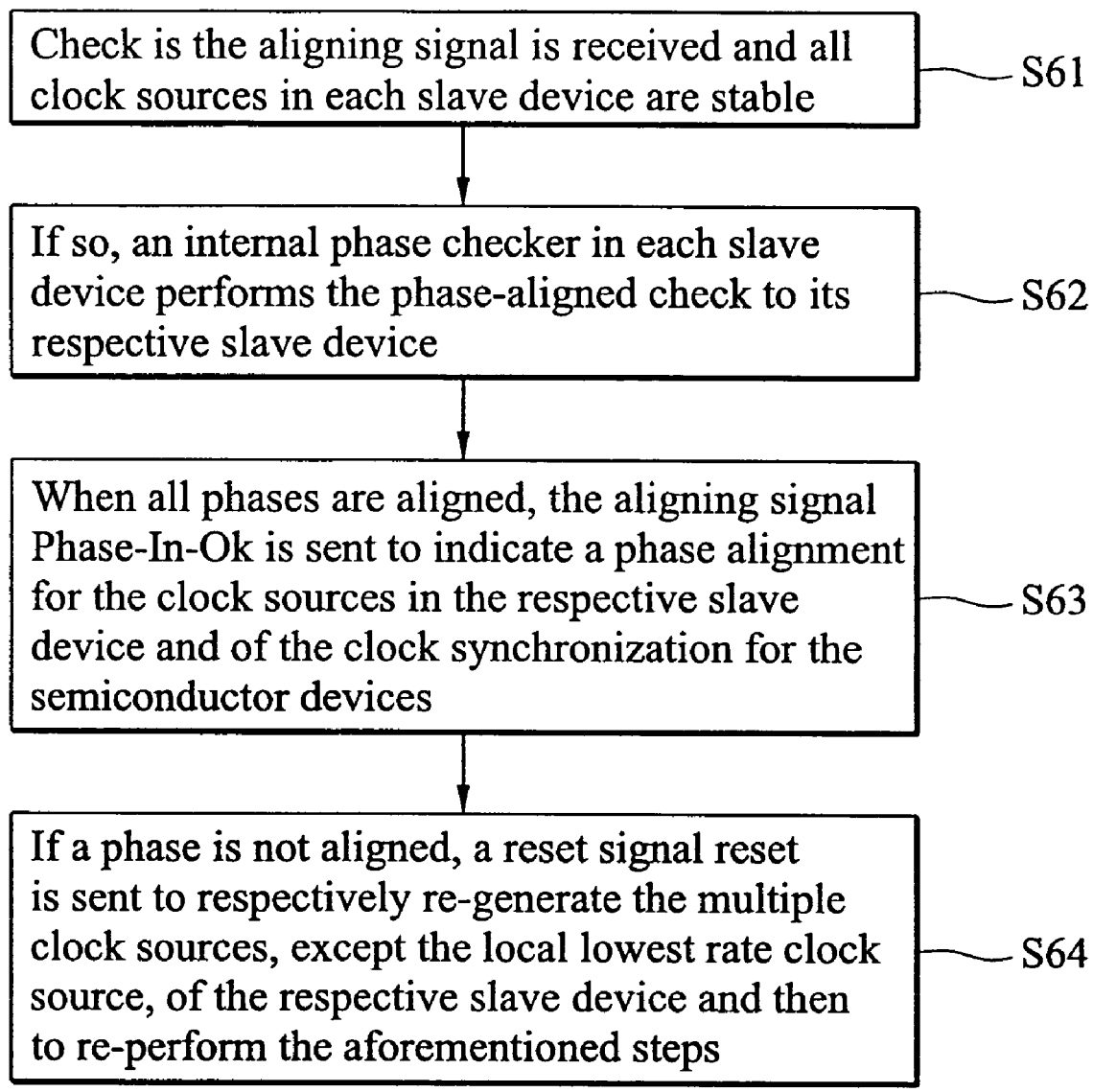
FIG. 11 is a flowchart of a synchronization of clock sources inside the slave elements respectively according to FIG. 8 of the invention.

Step S6 is further divided into the steps of FIG. 11, including, when the aligning signal is received and all clock sources in each slave device are stable (S61), an internal phase checker in each slave device performing the phase-aligned check on its respective slave device (S62); when all phases are aligned, the aligning signal Phase-In-OK is sent to indicate a phase alignment for the clock sources in the respective slave device and of the clock synchronization for the semiconductor devices (S63); and otherwise, a reset signal reset is sent to respectively re-generate the multiple clock sources, except the local lowest rate clock source, of the respective slave device and then repeat the aforementioned steps (S64).

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for synchronizing all clock sources of semiconductor devices, comprising:
   (a) generating multiple clock sources in a plurality of semiconductor devices;
   (b) designating one semiconductor device having a clock source with the lowest rate clock signal as a master device and other devices as slave devices when the multiple clock sources are stable;
   (c) designating the lowest rate clock signal of the master device as a reference clock source;
   (d) performing, according to the reference clock source, a phase-aligned check on other clock sources in the master device, such that other clock sources of the master device are synchronized with the reference clock source to generate a zeroing signal;
   (e) respectively performing, according to the zeroing signal, a phase-aligned check on a local lowest rate clock source in each slave device, such that all local lowest rate clock sources of the slave devices are synchronized with the lowest rate clock signal of the master device to respectively generate an aligning signal; and
   (f) respectively performing, according to the aligning signal, a phase-aligned check on other clock sources in each slave device, such that other clock sources of each slave device are separately synchronized with the local lowest rate clock signal of the respective slave devices, thereby completing clock synchronization for the plurality of semiconductor devices.

2. The method according to claim 1, wherein the plurality of semiconductor devices are implemented by Field Programmable Gate Array (FPGA) or Application Specific Integrated Circuit (ASIC).

3. The method according to claim 1, wherein the clock generators are implemented by delay locked loop (DLL) or digital clock manager (DCM).

4. The method according to claim 1, wherein step (d) further comprises: (d1) triggering a phase checker in the master device to sample the clock sources inside the master device for phase alignment comparison by means of rising or falling edges of an external input clock source; (d2) outputting the zeroing signal to concurrently signal each slave device when all phases are aligned; and (d3) otherwise, outputting a reset signal reset to re-generate multiple clock sources for re-alignment operation.

5. The method according to claim 1, wherein step (e) further comprises: (e1) respectively checking the lowest rate clock source of the master device through an external phase checker in each slave device to determine if the zeroing signal has been sent; (e2) respectively performing a phase-aligned check on each slave device through a respective external phase checker when the zeroing signal is received and all clock sources in each slave device are stable; (e3) respectively sending the aligning signal to indicate a phase alignment and clock synchronization for the lowest rate clock signal of the master device and the local lowest rate clock signal of the respective slave device when all phases are aligned; and (e4) otherwise, sending a reset signal to re-generate the local lowest rate clock signal of the respective slave device and then repeat step (e1).

6. The method according to claim 1, wherein step (f) further comprises: (f1) respective internal phase checkers in each slave device determining if a respective external phase checker has sent the aligning signal; (f2) respective internal phase checkers performing the phase-aligned check in a respective slave device when the aligning signal is received and all clock sources in the respective slave device are stable; (f3) sending the aligning signal to indicate a phase alignment for the clock sources in the respective slave device and a clock synchronization for the semiconductor devices when all phases are aligned; and (f4) otherwise, sending a reset signal reset to respectively re-generate the multiple clock sources, except the local lowest rate clock source, of the respective slave device and then repeat step (f1).

7. A system for synchronizing all clock sources of semiconductor devices, comprising:
   a first semiconductor device having a phase checker and a multi-clock generator including generation of the lowest rate clock source, wherein the phase checker performs phase alignment according to the lowest rate clock source, such that multiple clock sources generated by the multi-clock generator are synchronized and thus a zeroing signal is output;
   a plurality of second semiconductor devices, each having an external phase checker, an internal phase checker and a multi-clock generator including generation of a clock-aligned source, wherein the external phase checker performs phase alignment according to the zeroing signal, such that the lowest rate clock source and the clock-aligned source have phase synchronization to thus output an aligning signal to the internal phase checker for phase alignment, thereby synchronizing multiple clock sources generated by each second semiconductor, and thus completing clock synchronization of all semiconductor devices.

8. The system according to claim 7, wherein the semiconductor devices are Field Programmable Gate Arrays (FPGAs) or Application Specific Integrated Circuits (ASICs).

9. The system according to claim 7, wherein the clock generators are delay locked loop (DLLs) or digital clock managers (DCMs).

* * * * *